(12) United States Patent
Nishida et al.

(10) Patent No.: US 7,715,367 B2
(45) Date of Patent: May 11, 2010

(54) IP TELEPHONE SYSTEM, IP TELEPHONE APPARATUS AND COMMUNICATIONS METHOD

(75) Inventors: Toshiko Nishida, Kanagawa (JP); Kazuto Kobayashi, Kanagawa (JP); Akira Miyajima, Kanagawa (JP); Kentaro Tada, Tokyo (JP); Kiyoshi Toyoda, Tokyo (JP)

(73) Assignee: PANASONIC Corporation, Osaka (JP)

( * ) Notice: Subject to any disclaimer, the term of this patent is extended or adjusted under 35 U.S.C. 154(b) by 1330 days.

(21) Appl. No.: 11/183,966

(22) Filed: Jul. 19, 2005

(65) Prior Publication Data
US 2006/0018306 A1    Jan. 26, 2006

(30) Foreign Application Priority Data
Jul. 23, 2004    (JP) .............................. 2004-215923

(51) Int. Cl.
*H04L 12/66*    (2006.01)
(52) U.S. Cl. ......................... 370/352; 370/260; 370/261
(58) Field of Classification Search ................. 370/352, 370/260, 261
See application file for complete search history.

(56) References Cited

U.S. PATENT DOCUMENTS

| | | | | |
|---|---|---|---|---|
| 5,201,068 A | * | 4/1993 | Kawashima | ............. 455/550.1 |
| 6,038,305 A | * | 3/2000 | McAllister et al. | ..... 379/201.02 |
| 6,101,242 A | * | 8/2000 | McAllister et al. | ....... 379/88.02 |
| 7,027,582 B2 | * | 4/2006 | Khello et al. | .......... 379/220.01 |
| 7,274,683 B2 | * | 9/2007 | Segal | .......................... 370/352 |
| 7,289,620 B2 | * | 10/2007 | Shaffer et al. | .......... 379/215.01 |
| 2004/0047341 A1 | | 3/2004 | Staack et al. | |
| 2005/0182781 A1 | * | 8/2005 | Bouvet | ....................... 707/102 |

FOREIGN PATENT DOCUMENTS

| | | |
|---|---|---|
| JP | 2003-188992 | 7/2003 |
| WO | 01/41416 | 6/2001 |

OTHER PUBLICATIONS

English Language Abstract of JP 2003-188992.
ENUM Trial Japan, "ENUM Trial Japan First Report," May 2004, together with a partial English translation of the same.
U.S. Appl. No. 11/183,982 to Toshiko Nishida et al., filed Jul. 19, 2005.

(Continued)

*Primary Examiner*—Quynh H Nguyen
(74) *Attorney, Agent, or Firm*—Greenblum & Bernstein P.L.C.

(57) ABSTRACT

An IP telephone system includes an IP telephone apparatus, a Web server and an ENUM server. The IP telephone apparatus is connected to an IP network. The Web server registers talk volume information corresponding to a telephone number assigned to the IP telephone apparatus. The ENUM server registers a NAPTR resource record in which a URI specifies link data related to the talk volume information registered in the Web server. In the IP telephone system, the IP telephone apparatus that has received a call transmits, to the ENUM server, a query for a NAPTR record corresponding to a targeted recipient phone number. The IP telephone apparatus then transmits, to the Web server, a request for the talk volume information corresponding to the targeted recipient phone number according to the returned NAPTR resource record, and adjusts the talk volume according to the returned talk volume information.

16 Claims, 16 Drawing Sheets

OTHER PUBLICATIONS

U.S. Appl. No. 11/183,977 to Toshiko Nishida et al., filed Jul. 19, 2005.
U.S. Appl. No. 11/183,962 to Toshiko Nishida et al., filed Jul. 19, 2005.
U.S. Appl. No. 11/188,868 to Toshiko Nishida, filed Jul. 26, 2005.

Huston G, "Implications of ENUM", Internet Citation, Sep. 30, 2002, XP 002363539, URL: http://www.cisl.ucar.edu/nets/projects/Westnet/prev-mtg/200307.meeting/2003.presentations/enum.ppt>, pp. 1-31.

* cited by examiner

Fig.3

| Telephone number | URI |
|---|---|
| 05012341111 | JACK@tokyo.sip.jp |
| 05012342222 | ALICE@tokyo.sip.jp |

Fig.6

| Enum domain name | | Order | Preference | Flags | Service | | URI scheme | |
|---|---|---|---|---|---|---|---|---|
| | | | | | | | | URI |
| 1.1.1.1.4.3.2.1.0.5.1.8.e164.arpa | IN NAPTR | 100 | 10 | "u" | "E2U+sip" | "!^.*$!sip:" | JACK@tokyo.sip.jp | |
| | IN NAPTR | 100 | 10 | "u" | "E2U+http" | "!^.*$!http:" | //www.tokyo.sip.com/user JACK.html | |
| 2.2.2.2.4.3.2.1.0.5.1.8.e164.arpa | IN NAPTR | 100 | 10 | "u" | "E2U+sip" | "!^.*$!sip:" | ALICE@tokyo.sip.jp | |
| | IN NAPTR | 100 | 10 | "u" | "E2U+http" | "!^.*$!http:" | //www.tokyo.sip.com/user ALICE.html | |

NAPTR resource record

Fig.7

| URI | IP address |
| --- | --- |
| JACK@tokyo.sip.jp | 192.168.1.1 |
| ALICE@tokyo.sip.jp | 192.168.1.2 |
| TAROU@tokyo.sip.jp | 192.168.1.3 |
| HANAKO@tokyo.sip.jp | 192.168.1.4 |

Fig.8

| URI(URL) | Volume setting value |
|---|---|
| //www.tokyo.sip.com/user JACK.html | 5 |
| //www.tokyo.sip.com/user ALICE.html | 3 |
| | |

Fig.10

INVITE sip:JACK@tokyo.sip.jp SIP/2.0
Via:SIP/2.0/UDP Tokyo.sip.jp:5060;branch=z9hG4bk776as3
From:TAROU@tokyo.sip.jp;tag=r18f061962
To:JACK@tokyo.sip.jp

Fig.13

| Phone number | URI | Volume setting value |
|---|---|---|
| 05012341111 | JACK@tokyo.sip.jp | 5 |
| 05012342222 | ALICE@tokyo.sip.jp | 3 |

Fig.14

| Enum domain name | | Order | Preference | Flags | Service | | URI scheme | |
|---|---|---|---|---|---|---|---|---|
| | | | | | | | | URI |
| 1.1.1.1.4.3.2.1.0.5.1.8.e164.arpa | IN NAPTR | 100 | 10 | "u" | "E2U+sip" | "!^.*$!sip:" | JACK@tokyo.sip.jp" |
| 2.2.2.2.4.3.2.1.0.5.1.8.e164.arpa | IN NAPTR | 100 | 10 | "u" | "E2U+sip" | "!^.*$!sip:" | ALICE@tokyo.sip.jp" |

NAPTR resource record

IP TELEPHONE SYSTEM, IP TELEPHONE APPARATUS AND COMMUNICATIONS METHOD

BACKGROUND OF THE INVENTION

1. Field of the Invention

The present invention relates to an IP telephone system, an IP telephone apparatus and a communications method that perform voice communications via an IP network.

2. Description of Related Art

The recent rapid growth of the Internet has drawn attention to an IP telephone system that enables low-cost voice communications with telephone apparatuses at remote places as well as free voice communications between IP telephone apparatuses owned by subscribers. Among such IP telephone systems, there is a proposal for an IP telephone system that allows the transmitting party to specify a screen display or receiving tone on the receiving party's end for the purpose of improving users' convenience (See Prior Art 1).

On the other hand, as an underlying technology, ENUM is emerging as the focus of attention, enabling communications according to users' individual setting by effectively controlling information used for diversified communications tools, including telephones, faxes, cellular phones and electronic emails. ENUM is designed to identify the Internet service with a unique global identification number such as E.164, using the DNS (Domain Name System). Currently, the IETF (Internet Engineering Task force) is seeking to standardize ENUM platforms, where protocol specifications are discussed (See Publication 1).

[Related Art 1] Japanese Laid Open Publication 2003-188992

[Publication 1] Issued by ENUM Trial Japan "ENUM Trial Japan First Report" May, 2004

However, the above-described conventional IP telephone system can only allow the transmitting party to specify a desired operation performed on the receiving party's end, the operation being such as the screen display or the receiving tone when calls are received. The conventional IP telephone system is not capable of specifying operations according to call recipients' individual setting.

In general, IP telephone apparatuses used in homes or within corporations are shared by a plurality of users. Among them can be hearing-impaired elderly people who need a volume adjustment. Those users who need such a volume adjustment need to adjust the volume after voice communications start. When users who do not need the volume adjustment are set to talk next, they need to readjust the volume. In such a phone system, users' convenience can be improved when talk volume can be specified upon receiving a call to meet the need of each call recipient.

SUMMARY OF THE INVENTION

The present invention is provided to address the above-described problems. The purpose of the present invention is to provide an IP telephone system, an IP telephone apparatus and a communications method that can perform voice communication by specifying talk volume adjusted to each call recipient when a call is received.

The IP telephone system according to the present invention includes an IP telephone apparatus, a Web server and an ENUM server. The IP telephone apparatus is connected to an IP network. The Web server registers information specifying talk volume corresponding to telephone numbers that are assigned to the IP telephone apparatus. The ENUM server registers a NAPTR resource record in which a URI specifies link data related to talk volume information, which is registered in the Web server. In the IP telephone system, the IP telephone apparatus that has received a call, transmits, to the ENUM server, a query for a NAPTR resource record corresponding to a targeted recipient phone number. The IP telephone apparatus then transmits, to the Web server, a request for the talk volume information corresponding to the targeted recipient phone number, according to the returned NAPTR resource record, and adjusts the talk volume according to the returned talk volume information.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 illustrates an example of a table stored in a FROM of the IP telephone according to the first embodiment;

FIG. 6 illustrates an example of NAPTR records stored in a DB of the ENUM server according to the first embodiment;

FIG. 7 illustrates an example of data stored in a DB of a DNS server according to the first embodiment;

FIG. 8 illustrates an example of data stored in a DB of a Web server according to the first embodiment;

FIG. 10 illustrates an example of the message "INVITE" transmitted from the source IP telephone to the destination IP telephone in the IP telephone system according to the first embodiment;

FIG. 13 illustrates an example of data stored in a volume information table of the IP telephone according to the second embodiment;

FIG. 14 illustrates an example of NAPTR records stored in a DB of an ENUM server according to the second embodiment;

DETAILED DESCRIPTION OF PREFERRED EMBODIMENTS

The embodiments of the present invention are explained in the following, in reference to the above-described drawings.

First Embodiment

Figure 1:
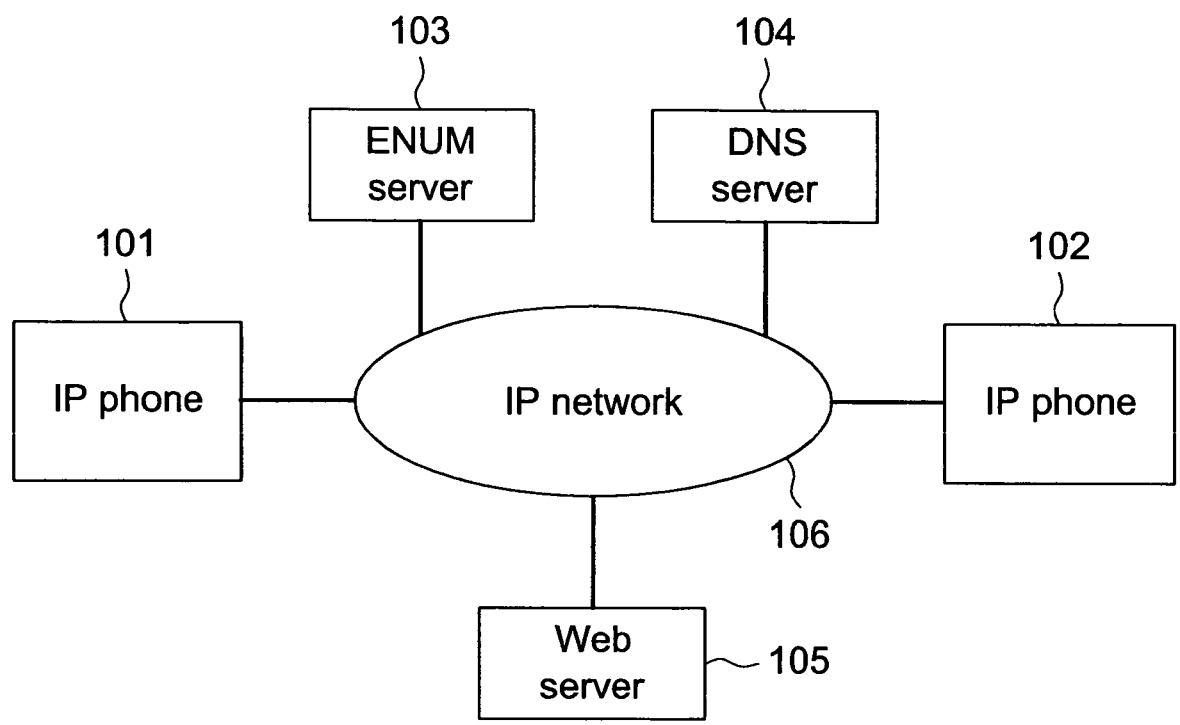
FIG. 1 illustrates a network configuration to which an IP telephone system according to the first embodiment of the present invention is applied.

FIG. 1 shows a network configuration to which the IP telephone system according to the first embodiment is applied.

As shown in FIG. 1, a plurality of IP telephone apparatuses (hereafter referred to as "IP phone") 101 and 102, ENUM server 103, DNS server 104 and Web server 105 are mutually connected via IP network 106 in the IP telephone system according to the embodiment. Also, the IP telephone system is not limited to this embodiment and can be configured to connect three or more IP phones in IP network 106.

IP phone 101 (102) has a function enabling voice communication with another IP phone via IP network 106. IP phone 101 (102) also has a function allowing users to browse HTML documents provided by Web server 105 by accessing Web server 105 according to the http protocol.

Particularly, IP phone 102 is shared by a plurality of users. IP phone 102 also has phone numbers assigned to each user. The following describes a case where IP phone 102 is shared by two users.

ENUM server 103 stores a database (DB) that registers a NAPTR resource record (hereafter referred to as "NAPTR record"), which is later described. ENUM server 103 returns, to IP phone 101 (102), a NAPTR record registered in the DB in response to a query from IP phone 101 (102).

DNS server 104 stores a DB that registers URIs specified in NAPTR records and their corresponding IP addresses. DNS server 104 returns, to IP phone 101 (102), an IP address registered in the DB in response to a query from IP phone 101 (102).

Web server 105 stores a DB that registers information specifying talk volume corresponding to each telephone number that is assigned to IP phone 101 (102) (hereafter referred to as "volume information"), the IP phone 101 being connected to IP network 106. The volume information registered in the DB is, for example, registered by IP phone 101 (102) users via IP network 106. The volume information can also be registered by an IP telephone service administrator at the request of the user. Web server 105 returns, to IP phone 101 (102), the volume information registered in the DB in response to a request from IP phone 101 (102) that has received a call.

Figure 2:
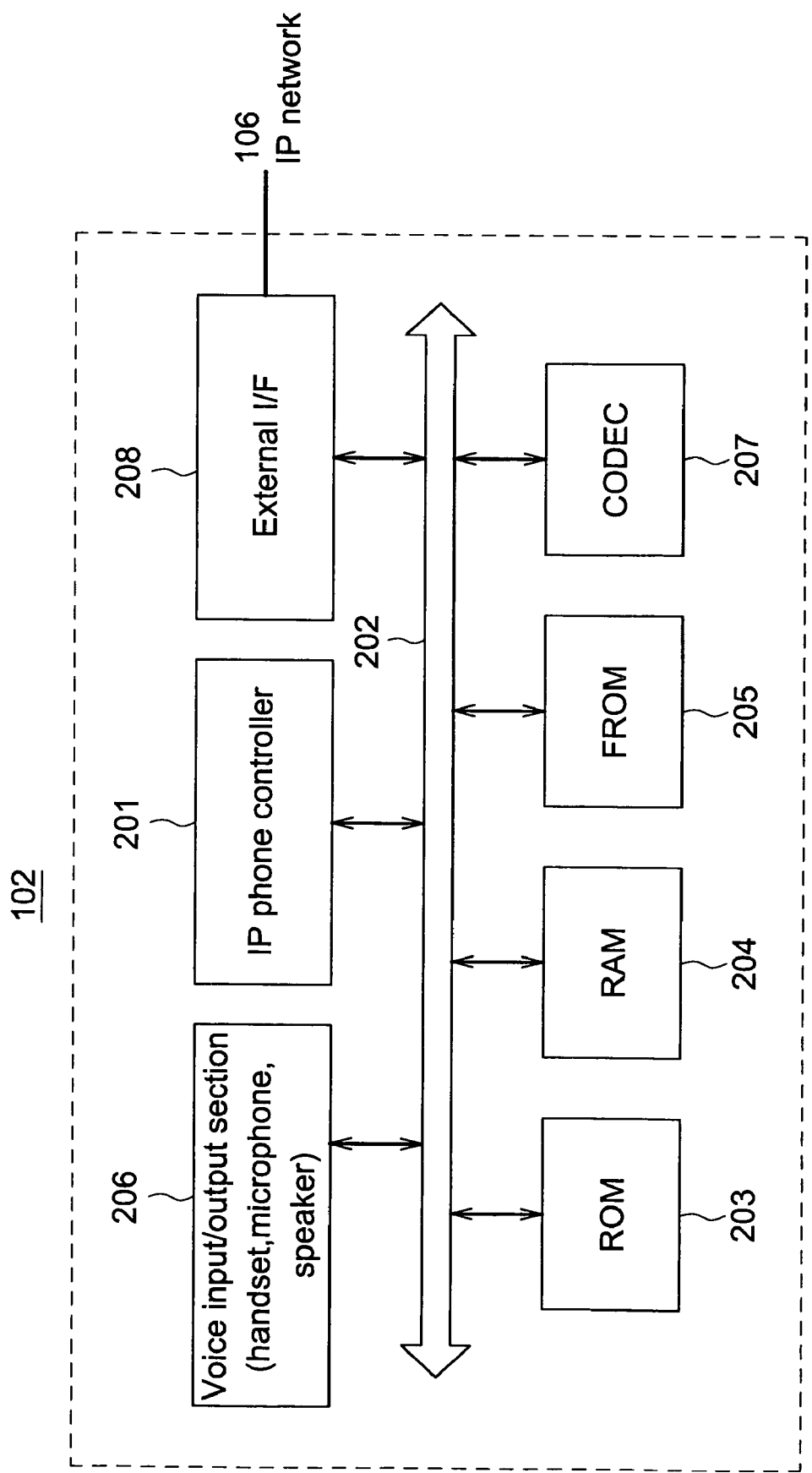
FIG. 2 is a block diagram illustrating a configuration of the IP telephone that includes the IP telephone system according to first the embodiment.

FIG. 2 is a block diagram illustrating a configuration of IP phone 102 according to the embodiment of the present invention. IP phone 101 has the same configuration as IP phone 102.

IP phone 102 shown in FIG. 2 includes IP phone controller 201 that controls the entire operation of the apparatus. ROM 203, RAM 204 and FROM 205 are connected to IP phone controller 201 via bus 202. Also, voice input/output section 206, CODEC 207 and external interface (I/F) 208 are connected to IP phone controller 201 via bus 202.

IP phone controller 201 executes the following control operation using a control program stored in ROM 203. In that time, IP phone controller 201 utilizes RAM 204 as a work area.

IP phone controller 201 controls all operations needed to perform voice communication via IP network 106. For example, IP phone controller 201 executes a call control operation with the destination terminal according to call control protocols such as SIP or H.323.

IP phone controller 201 transmits, to ENUM server 103, a query for a NAPTR record corresponding to the destination terminal, and controls the reception of a response to the query. IP phone controller 201 also transmits an IP address query to DNS server 104, and controls the reception of a response to the query.

Furthermore, IP phone controller 201 controls access to Web server 105 and a browsing of HTML documents provided by Web server 105.

FROM 205 stores address book data that is used to specify a destination when calling from the apparatus. FROM 205 also stores a table that registers phone numbers and their corresponding URIs, when a plurality of phone numbers are assigned.

FIG. 3 shows an example of a table stored in FROM 205. FIG. 3 shows a case where two phone numbers are assigned to IP phone 102. In the FIG. 3 table, FROM 205 stores URI "JACK@tokyo.sip.jp" corresponding to phone number "050-1234-1111". Similarly, FROM 205 stores URI "ALICE@tokyo.sip.jp" corresponding to phone number "050-1234-2222".

Voice input/output section 206 receives users' voice from IP phone 102 and makes a voice output to the user. Voice input/output section 206 is configured with a handset microphone as the voice input section and with a speaker as the voice output section.

CODEC 207 converts analog data input from voice input/output section 206 into digital data. CODEC 207 also converts digital data input from IP network 106 into analog data. CODEC 207 encodes the voice data and executes a compress/decompress operation to the voice data.

External I/F 208 functions as an interface with IP network 106 to which IP phone 102 is connected.

Figure 4:
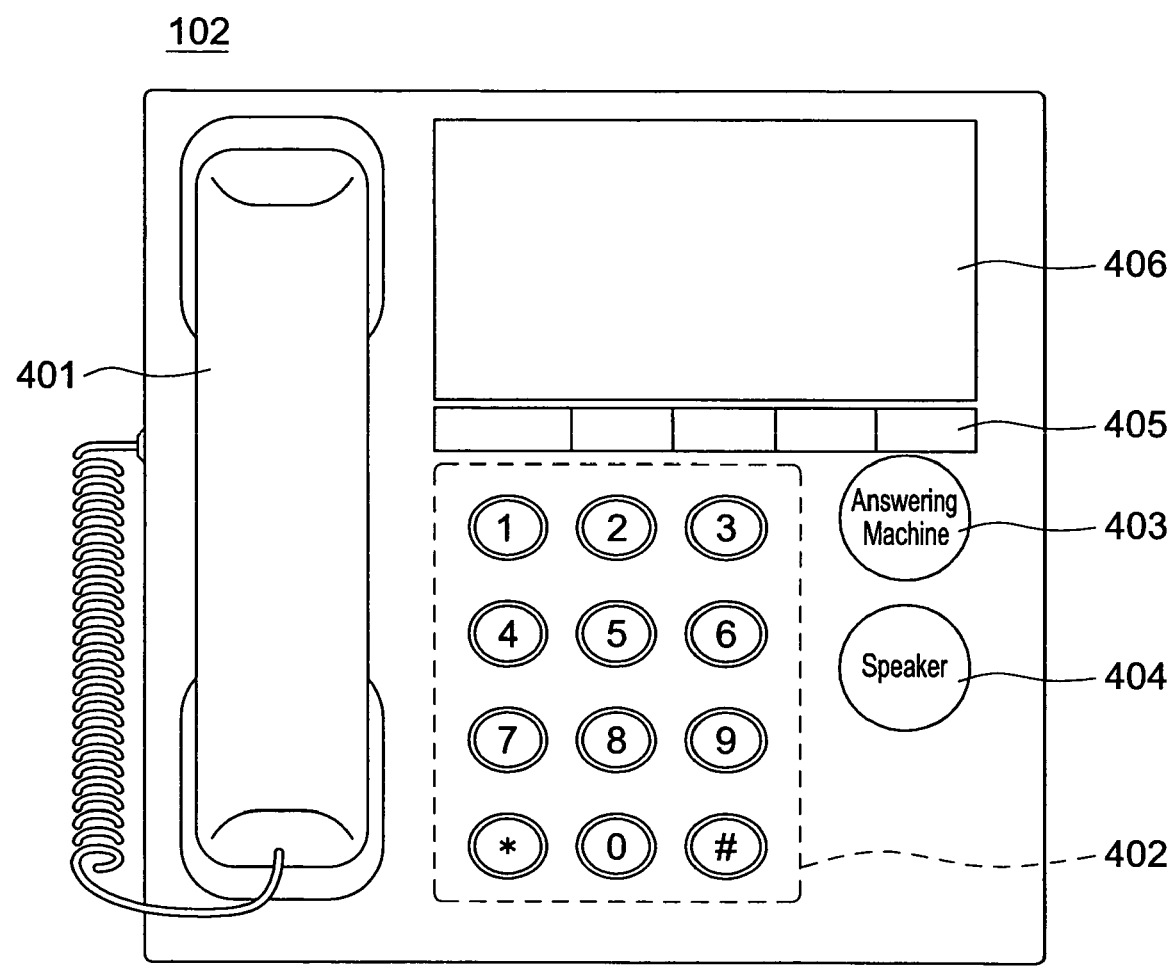
FIG. 4 illustrates the external front view of the IP telephone according to the first embodiment.

FIG. 4 shows the external front view of IP phone 102 according to the embodiment of the present invention. IP phone 101 has the same configuration as IP phone 102.

As shown in FIG. 4, IP phone 102 has receiver 401 that receives the operator's voice. IP phone 102 also has numeric keys 402 that receives telephone numbers or the like. To the right side of numeric keys 402 are AM (Answering Machine) button 403 and speaker button 404. AM button 403 is used to switch to answering machine mode. Speaker button 404 is used to switch to voice output mode.

Above numeric keys 402 is function button 405 that is able to set various functions such as a single touch function, the function enabling a single touch transmission. Above function button 405 is display 406 that is configured with an LCD and the like. Display 406 displays, for example, the current status of the apparatus or information regarding the destination.

Figure 5:
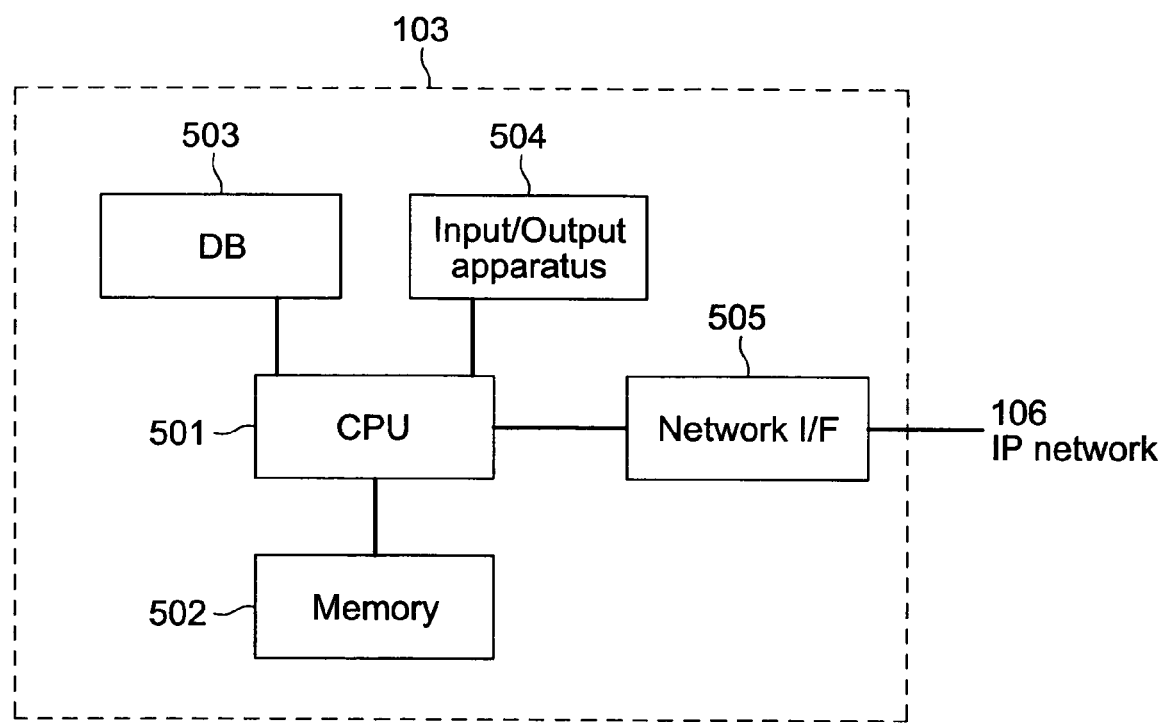
FIG. 5 is a block diagram illustrating a typical configuration of an ENUM server according to the first embodiment.

FIG. 5 is a block diagram illustrating a typical configuration of ENUM server 103 in the IP telephone system according to the embodiment of the present invention. DNS server 104 and Web server 105 in the IP telephone system according to the embodiment of the present invention have the same configuration except the data stored in the DB.

As shown in FIG. 5, ENUM server 103 includes CPU 501 that controls the entire operation of the server. Memory 502 is connected to CPU 501. Memory 502 has ROM functions and RAM functions. ROM stores the control program of ENUM server 103, which CPU 501 retrieves and executes. RAM functions as a work memory when CPU 501 executes the control program.

Database (DB) 503 is connected to CPU 501. DB 503 registers NAPTR records, which are later described. When receiving a NAPTR record query from IP phone 101, for example, CPU 501 searches for a corresponding NAPTR record among the data registered in DB 503, and returns the corresponding NAPTR record to IP phone 101.

Furthermore, Input/output apparatus 504 is connected to CPU 501. Input/output apparatus 504 can be configured with an input apparatus such as a keyboard and an output apparatus such as a display. The input apparatus is used to add and edit the data registered in DB 503. The output apparatus is used for an administrator of ENUM server 103 to confirm the data registered in DB 503.

Network Interface (I/F) 505 is connected to CPU 501. Network I/F 505 is an interface with IP network 106 to which ENUM server 103 is connected.

FIG. 6 shows an example of NAPTR records registered in DB 503 of ENUM server 103 according to the embodiment of the present invention. FIG. 6 shows a case where DB 503 registers NAPTR records corresponding to domain names obtained from phone numbers "05012341111" and "05012342222".

In FIG. 6, URIs "JACK@tokyo.sip.jp" and "//www.tokyo.sip.com/userJACK.html" correspond to domain name "1.1.1.1.4.3.2.1.0.5.1.8.e164.arpa" obtained from phone number "05012341111". The service field of the first URI specifies "E2U+sip" indicating that the terminal specified by "05012341111" is able to perform under the SIP protocol. The service field of the second URI specifies "E2U+http" indicating that the terminal specified by "05012341111" is able to perform under the http protocol.

URIs "ALICE@tokyo.sip.jp" and "//www.tokyo.sip.com/userALICE.html" correspond to domain name "2.2.2.2.4.3.2.1.0.5.1.8.e164.arpa" obtained from phone number "05012342222". The service field of the first URI specifies "E2U+sip" indicating that the terminal specified by "05012342222" is able to perform under the SIP protocol. The service field of the second URI specifies "E2U+http" indicating that the terminal specified by "05012342222" is able to perform under the http protocol.

FIG. 7 shows an example of data registered in a DB of DNS server 104 according to the embodiment of the present invention.

FIG. 7 shows a case where the DB registers IP addresses corresponding to URIs "JACK@tokyo.sip.jp", "ALICE@tokyo.sipjp", "TAROU@tokyo.sipjp" and "HANAKO@tokyo.sip.jp". More specifically, IP addresses "192.168.1.1", "192.168.1.2", "192.168.1.3" and "192.168.1.4" respectively correspond to URIs "JACK@tokyo.sip.jp", "ALICE@tokyo.sip.jp", "TAROU@tokyo.sip.jp" and "HANAKO@tokyo.sip.jp".

FIG. 8 shows an example of data registered in a DB of Web server 105 according to the embodiment of the present invention. In an actual setting, the data shown in FIG. 8 is described, for example, in HTML (Hypertext Markup Language).

FIG. 8 shows a case where the DB registers volume setting values corresponding to URIs (URLs) "//www.tokyo.sip.com/userJACK.html" and "//www.tokyo.sip.com/userALICE.html". More specifically, the voice setting value of "5" corresponds to URI (URL) "//www.tokyo.sip.com/userJACK.html". The volume setting value of "3" corresponds to URI "//www.tokyo.sip.com/userALICE.html".

Figure 9:
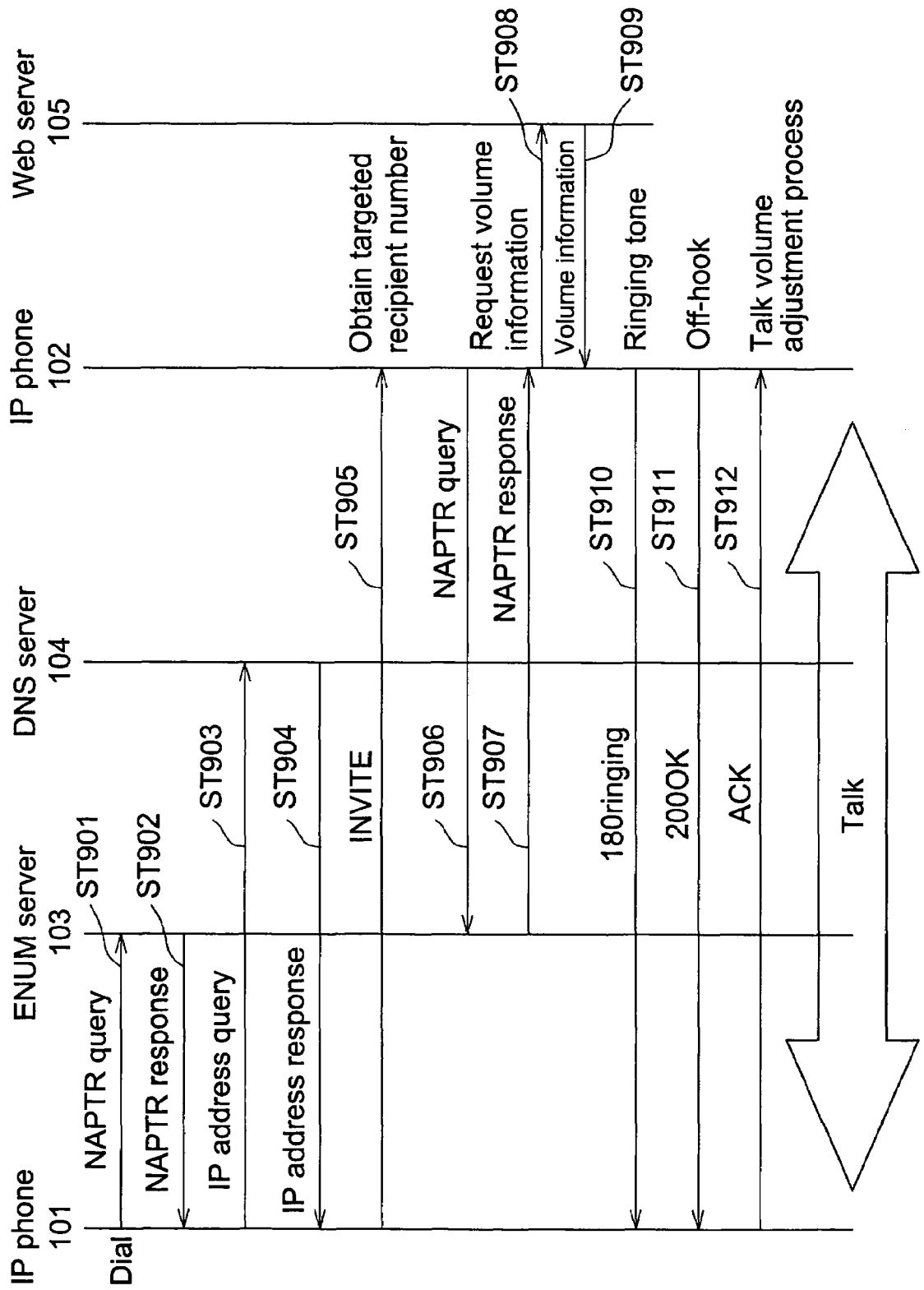
FIG. 9 is a sequence chart illustrating operations performed until a source IP telephone performs voice communication with a destination IP telephone in the IP telephone system according to the first embodiment.

The following describes the operations performed until IP phone 101 performs voice communication with IP phone 102 in the IP telephone system according to the embodiment of the present invention, with reference to the FIG. 9 sequence.

In this illustration, DB 503 of ENUM server 103 registers the NAPTR records shown in FIG. 6. The DB of DNS server 104 registers the data shown in FIG. 7. The DB of Web server 105 registers the data shown in FIG. 8. Phone numbers "05012341111" and "05012342222" are assigned to IP phone 102.

When performing voice communication with IP phone 102, IP phone 101 receives, from the user, one of the phone numbers assigned to IP phone 102. In this example, phone number "05012341111", among IP phone 102 phone numbers, is input. Upon receiving the input phone number, IP phone 101 transmits, to ENUM server 103, a query for a NAPTR record corresponding to the phone number (ST 901). In the following, this NAPTR record query is referred to as a "NAPTR query".

In this example, IP phone 101 first converts operator's input number "05012341111" into "+81-5-012341111" including the country code according to standard E. 164. Then, "+815012341111" is obtained, keeping +at the beginning and the numbers. Then, non numerical symbols are deleted, and dots are inserted between the numbers, resulting in "8.1.5.0.1.2.3.4.1.1.1.1". Next, the numbers are reversed, and string e164.arpa is added at the end. As a result, domain name "1.1.1.1.4.3.2.1.0.5.1.8. e164.arpa" is obtained. IP phone 101 then transmits the NAPTR query for the string.

Upon receiving the NAPTR query, ENUM server 103 searches for a NAPTR record corresponding to domain name "1.1.1.1.4.3.2.1.0.5.1.8.e164.arpa". ENUM server 103 then returns, to IP phone 101, a response including the NAPTR record (ST 902). In the following, a response including a NAPTR record is referred to as a "NAPTR response". In this example, ENUM server 103 finds the upper NAPTR record, among the NAPTR records shown in FIG. 6, as a result of the search and returns, to IP phone 101, a response including the NAPTR record.

Upon receiving the NAPTR response, IP phone 101 transmits, to DNS server 104, a query for the IP address corresponding to URI "JACK@tokyo.sipjp". The URI specified in the NAPTR record indicates that the destination terminal can correspond to the SIP protocol (ST 903). In the following, this IP address query is referred to as an "IP address query".

Upon receiving the IP address query, DNS server 104 searches for the IP address corresponding to the URI and returns, to IP phone 101, an IP address response including the IP address (ST 904). In this example, DNS server 104 finds the first IP address "192.168.1.1" shown in FIG. 7 as a result of the search and returns, to IP phone 101, a response including the IP address. In the following, a response including this IP address is referred to as an "IP address response".

Upon receiving the IP address response, IP phone 101 confirms an IP address assigned to one of IP phone 102 phone numbers, the IP phone number being specified by the user. IP phone 101 then transmits the message "INVITE" to the IP address destination (ST 905).

The following describes an example of the message "INVITE" transmitted from IP phone 101 to IP phone 102.

FIG. 10 shows an example of the message "INVITE" transmitted from IP phone 101 to IP phone 102.

As shown in FIG. 10, the message "INVITE" contains header "From" on the third line, while containing header "To" on the forth line. Header "From" specifies URI "TAROU@tokyo.sip.jp" corresponding to the phone number of the source IP phone 101. Header "To" specifies URI "JACK@tokyo.sip.jp" corresponding to the phone number of the destination IP phone 102. The data in header "From" and header "To" is not limited to the one shown in FIG. 10.

Upon receiving the message "INVITE" from IP phone 101, IP phone 102 obtains from the URI specified in header "To", a phone number specified as the recipient phone number (hereafter referred to as a "targeted recipient number"). More specifically, IP phone 102 obtains a targeted recipient number by searching for one of the phone numbers in the table stored in FROM 205, according to the URI specified in header "To". In this example, IP phone 102 obtains, as the targeted recipient number, telephone number "050-1234-1111" corresponding to URI "JACK@tokyo.sip.jp", which is specified in header "To".

IP phone 102 then transmits, to ENUM server 103, the NAPTR query for the targeted recipient number in the same manner as IP phone 101 after receiving the input phone number (ST 906). More specifically, IP phone 102 first converts operator's input number "05012341111" into "+81-5-012341111" including the country code according to standard E. 164. Then, "+8151012341111" is obtained, keeping + at the beginning and the numbers. Then, non numerical symbols are deleted, and dots are inserted between the numbers, resulting in "8.1.5.0.1.2.3.4.1.1.1.1". Next, the numbers are reversed, and string e164.arpa is added at the end. As a result, domain name "1.1.1.1.4.3.2.1.0.5.1.8. e164.arpa" is obtained. IP phone A102 then transmits, to ENUM server 103, the NAPTR query for the string.

Upon receiving the NAPTR query, ENUM server 103 searches for a NAPTR record corresponding to domain name "1.1.1.1.4.3.2.1.0.5.1.8.e164.arpa" and returns, to IP phone 102, a response including the NAPTR record (ST 907). In this example, ENUM server 103 finds, as a result of the search, the upper NAPTR record among the NAPTR records shown in FIG. 6 in the same process as ST 902 and returns, to IP phone 102, the NAPTR response including the NAPTR record.

Upon receiving the NAPTR response, IP phone 102 requests the volume information by accessing Web server 105, based on URI "//www.tokyo.sip.com/userJACK.html". The URI specified in the NAPTR record indicates that the destination terminal is able to perform under the http protocol (ST 908). In response to the request, Web server 105 returns the volume information to IP phone 102 (ST 909). In this example, Web server 105 returns, among the data shown in FIG. 8, the volume setting value of "5" as the volume information.

Upon receiving the volume information, IP phone 102 sounds a ringing tone. At the same time, IP phone 102 transmits the message "180 Ringing" to IP phone 101 (ST 910).

When an off-hook condition is detected at IP phone 102, IP phone 102 transmits, to IP phone 101, the message "200 OK", which indicates a connection approval (ST 911). Upon receiving the message "200 OK", IP phone 101 transmits the message "ACK" to IP phone 102 (ST 912).

When receiving the message "ACK", IP phone 102 performs a process to adjust the talk volume based on the volume information obtained at ST 909 (hereafter referred to as a "talk volume adjustment process"). In this example, IP phone 102 adjusts the talk volume based on the volume setting value of "5", which is obtained at ST 909.

After IP phone 102 performs the talk volume adjustment process, voice communication becomes possible between IP phone 101 and IP phone 102. In an actual voice communication, a voice output from IP phone 101 is received, having the volume setting value of "5", by IP phone 102.

Figure 11:
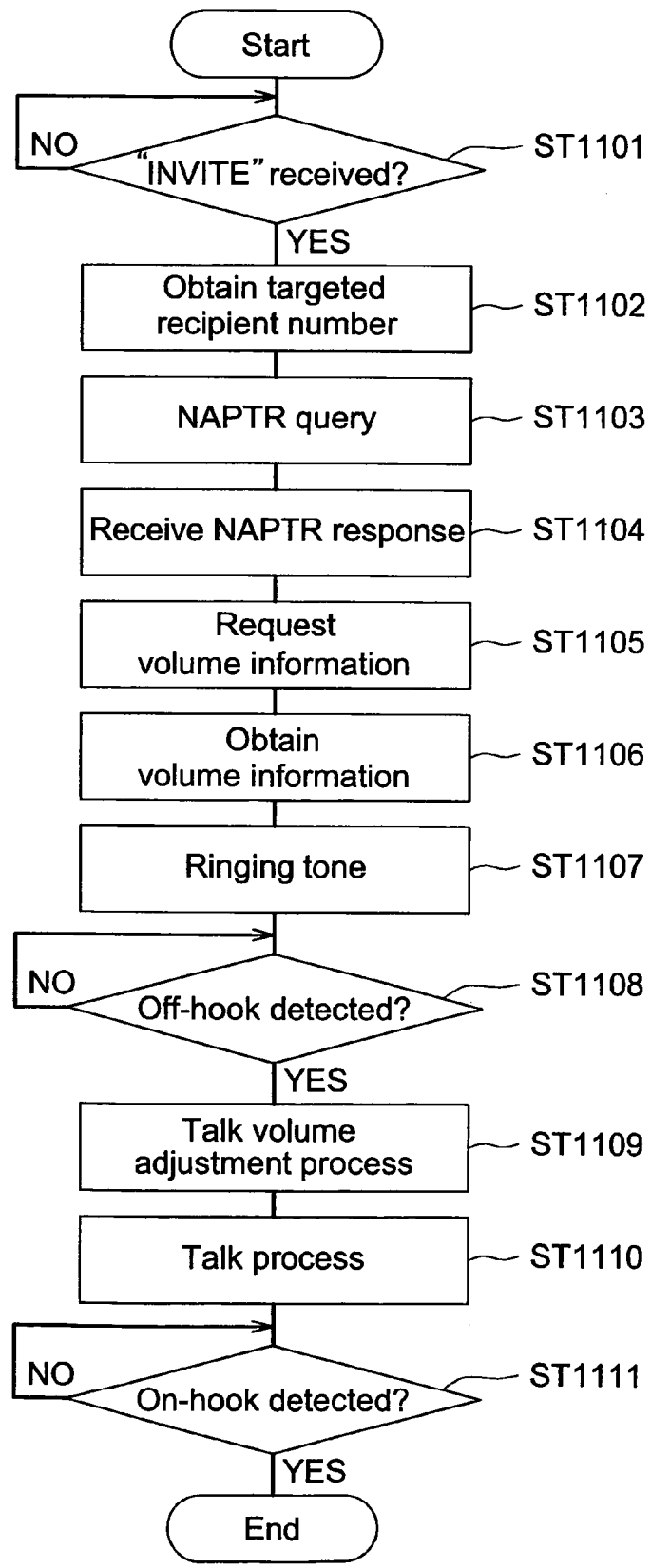
FIG. 11 is a flow chart illustrating an operation of the destination IP telephone in the FIG. 9 sequence.

FIG. 11 is a flow chart illustrating an operation of the destination IP phone 102 in the FIG. 9 sequence.

IP phone 102 monitors, at a standby state, for the reception of the message "INVITE" via IP network 106 (ST 1101). When the message "INVITE" is received, IP phone 102 obtains a targeted recipient number from header "To" of the message "INVITE".

After obtaining the targeted recipient number, IP phone 102 transmits, to ENUM server 103, the NAPTR query for the targeted recipient number (ST 1103). In response to the query, ENUM server 103 returns the NAPTR response, and thereby IP phone 102 receives that NAPTR response (ST 1104).

Upon receiving the NAPTR response, IP phone 102 accesses Web server 105 based on the URI (URL) specified in the NAPTR record, among the NAPTR records included in the NAPTR response, the record indicating that the destination terminal is able to perform under the http protocol. IP phone 102 then requests the volume information (ST 1105). In response to the request, Web server 105 returns the volume specifying information, and thereby IP phone 102 obtains the volume information (ST 1106).

Upon obtaining the volume information, IP phone 102 sounds a ringing tone (ST 1107). IP phone 102 then determines whether the off-hook condition is detected at the user side (ST 1108), and the process of ST 1108 is repeated until the off-hook condition is detected.

When the off-hook condition is detected, IP phone 102 transmits, to the source IP phone 101, the message "200 OK", which indicates a connection approval. Upon receiving the message "ACK" transmitted from IP phone 101 in response to the message "200 OK", IP phone 102 performs the talk volume adjustment process according to the volume information, which is obtained at ST 1106 (ST 1109).

After performing the talk volume adjustment process, IP phone 102 performs a talk process (ST 1110). In such a talk process, IP phone 102 can perform voice communication at the talk volume adjusted at ST 1109. When the talk process starts, IP phone 102 determines whether the on-hook condition is detected at the user side (ST 1111). When the on-hook condition is detected, IP phone 102 terminates the process. ST 1111 is repeated until the on-hook condition is detected.

In the IP telephone system according to the embodiment of the present invention, IP phone 102 that has received a call adjusts the talk volume according to the volume information corresponding to a targeted recipient number, which is returned from Web server 105. Accordingly, it becomes possible to perform voice communication at the adjusted talk volume corresponding to the targeted recipient number. As a result, it becomes possible to perform voice communication by specifying the talk volume according to the call recipient when a call is received.

Particularly, in the IP telephone system according to the embodiment of the present invention, Web server 105 transmits the volume information corresponding to the targeted recipient number according to the http protocol in response to a request from IP phone 102 that has received a call. Accordingly, the volume information corresponding to the targeted recipient number can be obtained by executing a call control process according to the http protocol.

In the IP telephone system according to the embodiment of the present invention, IP phone 102 that has received a call obtains a targeted recipient number based on the received message "INVITE". More specifically, IP phone 102 obtains, as the targeted recipient number, the phone number corresponding to the URI specified in the message "INVITE". Accordingly, IP phone 102 can obtain the targeted recipient number in the talk control process performed according to the SIP protocol.

In the embodiment of the present invention, the source IP phone transmits, to DNS server 104 provided on IP network 106, the IP address query and transmits the message "INVITE" according to the obtained IP address. However, the embodiment is not limited to this example. A CA (Call Agent) that functions as a SIP server can be provided on IP network 106 so that the message "INVITE" is transmitted by specifying the telephone number of the destination terminal.

In the embodiment of the present invention, URIs are specified in header "From" and header "To" of the message "INVITE". However, the embodiment is not limited to this example. Telephone numbers can be used instead of URIs. In this case, it is possible to skip the process of obtaining a targeted recipient number with reference to the table in FROM 205 by retrieving a phone number as the targeted recipient number.

In the embodiment of the present invention, IP phone 102 that has received a call obtains, from Web server 105, the volume information according to the http protocol. However, the method of obtaining the volume information is not limited to obtaining, from Web server 105, the volume information according to the http protocol. For example, the volume information can be obtained from a DB server provided separately, the DB server using LDAP (Lightweight Directory Access Protocol) or FTP (File transfer Protocol).

The above describes a case where the destination IP phone obtains the volume information from Web server 105. However, the same effect as the present embodiment can be expected by pre-registering the volume information corresponding to each phone number that is assigned to the destination IP phone. The following describes the embodiment of the present invention in which such a configuration is applied to the destination IP phone.

Second Embodiment

Figure 12:
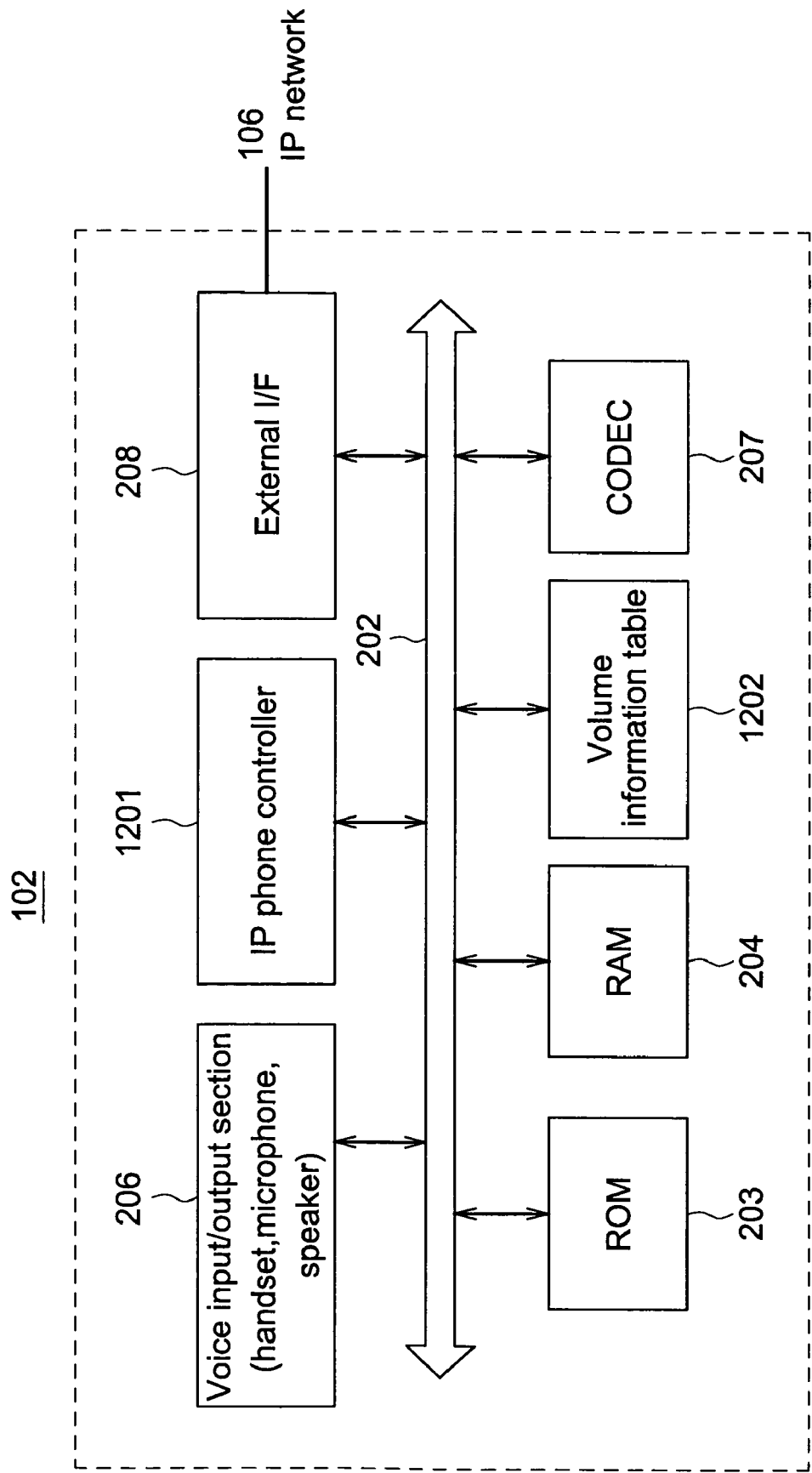
FIG. 12 is a block diagram illustrating a configuration of an IP telephone in the IP telephone system according to the second embodiment.

FIG. 12 is a block diagram illustrating a configuration of IP phone 102 according to the second embodiment of the present invention.

IP phone 102 shown in FIG. 12 differs from IP phone 102 in FIG. 2 in that IP phone 102 in FIG. 12 has a table, instead of FROM 205, the table registering the volume information corresponding to each phone number that is assigned to IP phone 102 (hereafter referred to as a "volume information table"). The address book data stored in FROM 205 is registered in the volume information table. Another difference is that the IP phone controller of IP phone 102 in FIG. 12 has no function to control operations related to Web server 105, but has a function which controls the talk volume according to the volume information stored in the volume information table. In FIG. 12, the components having the same symbols as in FIG. 2 have the same functions, and their descriptions are omitted.

IP phone controller 1201 has the same functions as IP phone controller 201 shown in FIG. 2 except that IP phone controller 1201 has no function to control access to Web server 105 and a browsing of HTML documents provided by Web server 105.

IP phone controller 1201 has a function which determines a phone number corresponding to a URI specified by the source IP phone via IP network 106 and a function which controls talk volume according to the corresponding phone number. More specifically, IP phone controller 1201 searches for one of the phone numbers registered in volume information table 1202 according to a URI specified by the source IP phone. IP phone controller 1201 then controls the talk volume by adjusting a voice output from voice input/output section 206, based on the volume setting value corresponding to the phone number.

FIG. 13 shows an example of data registered in volume information table 1202. FIG. 13 shows a case where two phone numbers are assigned to IP phone 102.

Volume information table 1202 registers URIs and volume setting values corresponding to each phone number that is assigned to IP phone 102. In FIG. 13, URI "JACK@tokyo.sip.jp" and the volume setting value of "5" corresponding to phone number "05012341111" are registered. Also, URI "ALICE@tokyo.sip.jp" and the volume setting value of "3" corresponding to phone number "05012342222" are registered.

FIG. 14 shows an example of NAPTR records registered in DB 503 of ENUM server 103 according to the second embodiment of the present invention. FIG. 14 shows a case where DB 503 registers NAPTR records corresponding to domain names obtained from phone numbers "05012341111" and "05012342222".

In FIG. 14, URI "JACK@tokyo.sip.jp" corresponds to domain name "1.1.1.1.4.3.2.1.0.5.1.8.e164.arpa" obtained from phone number "05012341111". Also, URI "ALICE@tokyo.sipjp" corresponds to domain name "2.2.2.2.4.3.2.1.0.5.1.8.e164.arpa" obtained from phone number "05012342222".

Figure 15:
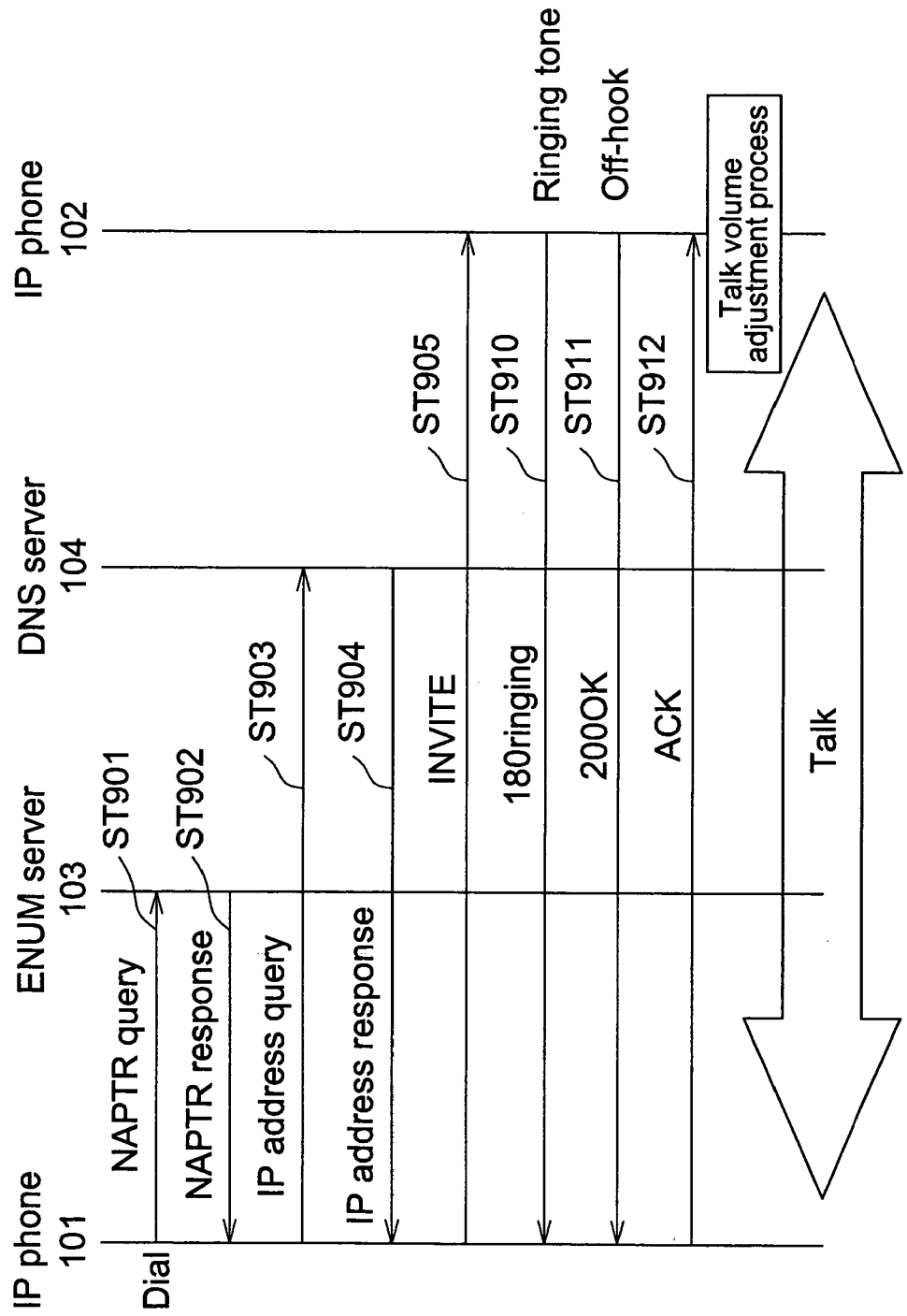
FIG. 15 is a sequence chart illustrating operations performed until a source IP phone performs voice communication with a destination IP phone in the IP telephone system according to the second embodiment.

The following describes the operations performed until IP phone 101 performs voice communication with IP phone 102 in the IP telephone system according to the second embodiment of the present invention with reference to the FIG. 15 sequence. In FIG. 15, the same processes as FIG. 9 have the same symbols, and their descriptions are omitted.

In this illustration, DB 503 of ENUM server 103 registers the NAPTR records shown in FIG. 14, and the DB of DNS server 104 registers the data shown in FIG. 7. Phone numbers "05012341111" and "05012342222" are assigned to IP phone 102.

The IP telephone system according to the second embodiment of the present invention differs from the IP telephone system according to the first embodiment in that the destination IP phone 102 in the second embodiment does not perform ST 906-ST 909 shown in FIG. 9. Another difference is that, in the IP telephone system according to the second embodiment of the present invention, the talk volume adjustment process can be performed only at the destination IP phone 102 without obtaining the volume information from Web server 105.

More specifically, when receiving the message "INVITE" from IP phone 101 at ST 905, IP phone 102 confirms the URI specified in header "To" of the message "INVITE". In this example, the data shown in FIG. 10 is transmitted as the message "INVITE". IP phone 102 confirms URI "JACK@tokyo.sip.jp" specified in header "To". After ST 910-ST 912, IP phone 102 obtains the volume setting value corresponding to the confirmed URI from volume information table 1202, and executes the talk volume adjustment process.

Figure 16:
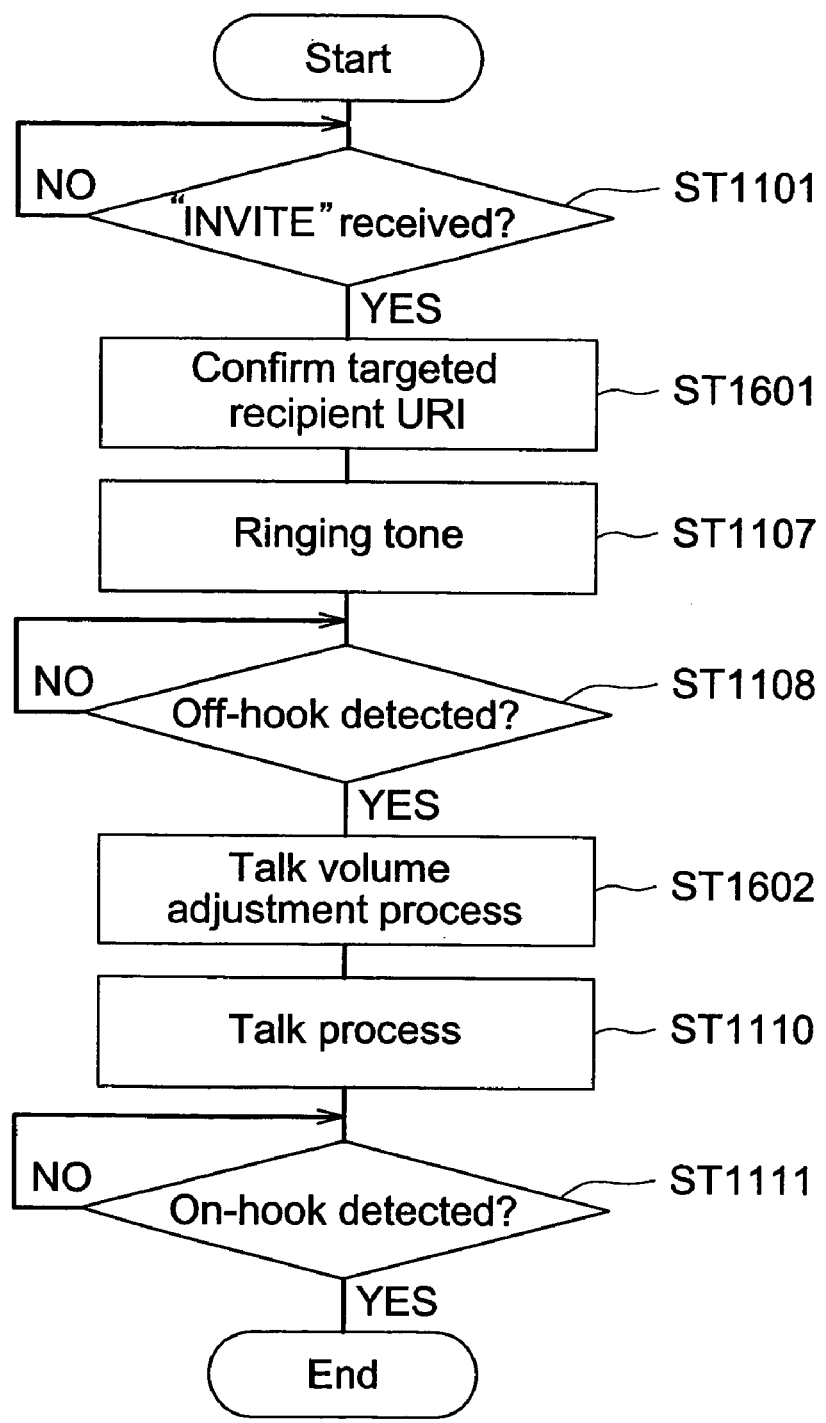
FIG. 16 is a flow chart illustrating an operation of the destination IP phone in the FIG. 15 sequence.

FIG. 16 is a flow chart illustrating an operation of the destination IP phone 102 in the FIG. 15 sequence. FIG. 16 uses the same symbols as FIG. 11 for the same processes, and their descriptions are omitted.

When receiving the message "INVITE" at ST 1101 in the IP telephone system according to the second embodiment of the present invention, the destination IP phone 102 confirms the URI specified in header "To" as the targeted recipient (hereafter referred to as a "targeted recipient URI") (ST 1601). After confirming the targeted recipient URI, IP phone 102 sounds a ringing tone (ST 1107), and monitors for the user's off-hook operation (ST 1108). After detecting the off-hook condition and then receiving the message "ACK" in response to the message "200 OK", IP phone 102 executes the talk volume adjustment process (ST 1602).

In the talk volume adjustment process, IP phone 102 obtains the volume setting value registered in volume information table 1202 according to a targeted recipient URI, which is confirmed at ST 1102. IP phone 102 then adjusts the talk volume based on the volume setting value. In this example, since "JACK@tokyo.sip.jp" is confirmed as the targeted recipient URI, IP phone 102 adjusts the talk volume based on the volume setting value of "5" corresponding to the targeted recipient URI, by referring to volume information table 1202.

After performing the talk volume adjustment process, IP phone 102 performs the talk process (ST 1110). In such a talk process, IP phone 102 can perform voice communication at the talk volume adjusted at ST 1602. When IP phone 102 monitors for the user's on-hook condition (ST 1111) and detects the on-hook condition, IP phone 102 terminates the process. Accordingly, voice communication is preformed at the adjusted talk volume corresponding to a URI specified by the source IP phone 101.

As descried above, in the IP telephone system according to the second embodiment of the present invention, the destination IP phone 102 adjusts the talk volume according to the talk volume information corresponding to a URI specified. by the source IP phone 101. Thus, it becomes possible to perform voice communication by changing the talk volume according to the targeted recipient URI. At the destination IP phone 102, phone numbers and their corresponding URIs are registered in volume information table 1202. IP phone 102 adjusts the talk volume according to the targeted recipient URI, and thereby it becomes possible to perform voice communication by specifying the talk volume corresponding to the call recipient when a call is received.

In the IP telephone system according to the present invention, voice is not limited to human voice. It also includes sounds in general, for example, modem signals modulated to voice bands and fax signals. Also, the telephone can be a fax apparatus as well.

Furthermore, in the IP telephone system according to the present embodiment, the IP phone is described as a single device. However, it is not limited to this embodiment. In other words, the IP phone can be configured by connecting an ordinary telephone apparatus to a control adapter that has a function which uses the connected ordinary telephone apparatus as an IP phone. In this illustration, the ordinary telephone apparatus is a telephone apparatus that has no voice communication functions via IP network 106.

The IP telephone described above includes an IP telephone defined by the government and operated by a telecommunications provider. It also includes an IP telephone provided on a local network or a private network using TCP/IP or other computer network protocols.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-215923 filed on Jul. 23, 2004, entire content of which is expressly incorporated by reference herein.

What is claimed is:

1. An IP telephone system comprising:
    an IP telephone apparatus that is connected to an IP network;
    a Web server that registers talk volume information corresponding to a telephone number assigned to said IP telephone apparatus, and returns the talk volume information in response to a request from said IP telephone apparatus; and
    an ENUM (Telephone Number Mapping) server that registers a NAPTR (Name Authority Pointer) resource record in which a URI (Uniform Resource Identifier) specifies link data related to the talk volume information and returns the NAPTR resource record in response to a query from said IP telephone apparatus,
    wherein said IP telephone apparatus that has received a call transmits, to said ENUM server, a query for a NAPTR resource record according to a targeted recipient phone number, and transmits, to said Web server, a request for the talk volume information corresponding to the targeted recipient phone number according to the returned NAPTR resource record, and adjusts talk volume according to the returned talk volume information, and
    wherein a predetermined protocol is specified in the NAPTR resource record registered in said ENUM server, and said IP telephone apparatus that has received a call transmits, to said Web server, the request for the talk volume information corresponding to the targeted recipient phone number according to the predetermined protocol.

2. The IP telephone system according to claim 1, wherein an http protocol is specified in the NAPTR resource record registered in said ENUM server, and said IP telephone apparatus that has received a call transmits, to said Web server, the request for the talk volume information corresponding to the targeted recipient phone number according to the http protocol.

3. The IP telephone system according to claim 1, wherein said IP telephone apparatus that has received a call obtains the targeted recipient phone number based on a description of a received INVITE message.

4. An IP telephone apparatus that is connected to a Web server and an ENUM (Telephone Number Mapping) server, the Web server registering talk volume information corresponding to a telephone number assigned to an IP telephone apparatus on an IP network, the ENUM server registering a NAPTR (Name Authority Pointer) resource record in which a URI (Uniform Resource Identifier) specifies link data related to the talk volume information, the IP telephone apparatus comprising:
    a query unit that transmits, to the ENUM server, a query for a NAPTR resource record according to a targeted recipient phone number, when receiving a call from another IP telephone apparatus on the IP network;
    a requester that transmits, to the Web server, a request for the talk volume information corresponding to the targeted recipient phone number according to the returned NAPTR resource record; and an adjuster that adjusts talk volume according to the returned talk volume information, wherein a predetermined protocol is specified in the NAPTR resource record registered in said ENUM server, and said IP telephone apparatus that has received a call transmits, to said Web server, the request for the talk volume information corresponding to the targeted recipient phone number according to the predetermined protocol.

5. The IP telephone apparatus according to claim 4, wherein said requester transmits, to the Web server, a request for the talk volume information corresponding to the targeted recipient phone number according to an http protocol, the protocol being specified in the NAPTR resource record registered in the ENUM server.

6. The IP telephone apparatus according to claim 4, wherein said query unit transmits a query for the NAPTR resource record according to the targeted recipient phone number obtained based on a description of INVITE message, the message being received from another IP telephone apparatus.

7. A communication method comprising:

using an IP telephone apparatus that is connected to a Web server and an ENUM (Telephone Number Mapping) server, the Web server registering talk volume information corresponding to a telephone number assigned to an IP telephone apparatus on an IP network, the ENUM server registering a NAPTR (Name Authority Pointer) resource record in which a URI (Uniform Resource Identifier) specifies link data related to the talk volume information, wherein, when a call is received from another IP telephone apparatus on the IP network, a query is transmitted to the ENUM server, the query being for a NAPTR resource record according to a targeted recipient phone number, a request is transmitted to the Web server, the request being for the talk volume information corresponding to the targeted recipient phone number according to the returned NAPTR resource record, and talk volume is adjusted according to the returned talk volume information, and wherein a predetermined protocol is specified in the NAPTR resource record registered in said ENUM server, and said IP telephone apparatus that has received a call transmits, to said Web server, the request for the talk volume information corresponding to the targeted recipient phone number according to the predetermined protocol.

8. The communication method according to claim 7, wherein a request is transmitted to the Web server, the request being for the talk volume information corresponding to the targeted recipient phone number according to an http protocol, the protocol being specified in the NAPTR resource record registered in the ENUM server.

9. The communication method according to claim 7, wherein the targeted recipient phone number is obtained based on a description of INVITE message, the message being received from another IP telephone apparatus.

10. An IP telephone system comprising:

an IP telephone apparatus that is on an IP network and that registers a URI (Uniform Resource Identifier) and talk volume information corresponding to a telephone number assigned to the IP telephone apparatus; and an ENUM (Telephone Number Mapping) server that registers a NAPTR (Name Authority Pointer) resource record specifying a URI corresponding to a telephone number assigned to said IP telephone apparatus, and returns a NAPTR resource record in response to a query from said IP telephone apparatus, wherein a source IP telephone apparatus transmits, to said ENUM server, a query for a NAPTR resource record by specifying a telephone number, and places a call based on a URI specified in the returned NAPTR resource record, and wherein a destination IP telephone apparatus adjusts talk volume according to the talk volume information corresponding to the URI specified by the source IP telephone apparatus, and wherein a predetermined protocol is specified in the NAPTR resource record registered in said ENUM server, and said IP telephone apparatus that has received a call transmits the request for the talk volume information corresponding to the targeted recipient phone number according to the predetermined protocol.

11. A communication method for an IP telephone apparatus on an IP network, the method comprising:

using an IP telephone apparatus that is connected to an ENUM (Telephone Number Mapping) server, the ENUM (Uniform Resource Identifier) server registering a NAPTR (Name Authority Pointer) resource record that specifies a URI corresponding to a telephone number assigned to an IP telephone apparatus on an IP network, and registers a URI and talk volume information corresponding to a telephone number assigned to the IP telephone apparatus, wherein a source IP telephone apparatus transmits, to the ENUM server, a query for a NAPTR resource record by specifying a telephone number, and places a call based on a URI specified in the returned NAPTR resource record, and wherein a destination IP telephone apparatus adjusts talk volume according to the talk volume information corresponding to the URI specified by the source IP telephone apparatus, and wherein a predetermined protocol is specified in the NAPTR resource record registered in said ENUM server, and said IP telephone apparatus that has received a call transmits the request for the talk volume information corresponding to the targeted recipient phone number according to the predetermined protocol.

12. The IP telephone system of claim 1, wherein the talk volume information is obtained independently of detection of an off-hook condition and the talk volume is adjusted after an off-hook condition is detected but before communication becomes enabled.

13. The IP telephone apparatus of claim 4, wherein the requester transmits the talk volume information independently of detection of an off-hook condition and the adjuster adjusts the talk volume after an off-hook condition is detected but before communication becomes enabled.

14. The communication method of claim 7, wherein the request for talk volume information is independent of detection of an off-hook condition and the talk volume is adjusted after an off-hook condition is detected but before communication becomes enabled.

15. The IP telephone system of claim 10, wherein the talk volume is adjusted after an off-hook condition is detected but before communication becomes enabled.

16. The communication method of claim 11, wherein the talk volume is adjusted after an off-hook condition is detected but before communication becomes enabled.

* * * * *